US012456813B2

(12) United States Patent
Cavallo et al.

(10) Patent No.: US 12,456,813 B2
(45) Date of Patent: Oct. 28, 2025

(54) HELICAL SLOW-WAVE STRUCTURES WITH INTEGRATED COUPLERS OF THz RADIATION: DEVICES AND METHODS OF FABRICATION

(71) Applicant: UNM Rainforest Innovations, Albuquerque, NM (US)

(72) Inventors: Francesca Cavallo, Albuquerque, NM (US); Divya Prakash, Albuquerque, NM (US); Daniel W. van der Weide, Albuquerque, NM (US); Max G. Lagally, Albuquerque, NM (US); Shiva Hajitabarmarznaki, Albuquerque, NM (US); Shelley S. Scott, Albuquerque, NM (US)

(73) Assignee: UNM Rainforest Innovations, Albuquerque, NM (US)

( * ) Notice: Subject to any disclaimer, the term of this patent is extended or adjusted under 35 U.S.C. 154(b) by 141 days.

(21) Appl. No.: 18/508,172

(22) Filed: Nov. 13, 2023

(65) Prior Publication Data

US 2024/0162620 A1 May 16, 2024

Related U.S. Application Data

(60) Provisional application No. 63/424,465, filed on Nov. 10, 2022.

(51) Int. Cl.

*H01Q 11/08* (2006.01)
*H01Q 1/38* (2006.01)
*H01Q 13/02* (2006.01)

(52) U.S. Cl.

CPC ............... *H01Q 11/08* (2013.01); *H01Q 1/38* (2013.01); *H01Q 13/02* (2013.01)

(58) Field of Classification Search

CPC .......... H01Q 11/08; H01Q 1/38; H01Q 13/02; H01Q 13/0225; H01Q 21/08

See application file for complete search history.

(56) References Cited

U.S. PATENT DOCUMENTS

2008/0272698 A1* 11/2008 Dayton .................. H01J 25/34 315/3.5
2021/0367573 A1* 11/2021 Lagally ..................... H03F 3/58
2022/0044904 A1* 2/2022 Lagally .................. C23C 16/06

* cited by examiner

*Primary Examiner* — David E Lotter
(74) *Attorney, Agent, or Firm* — Keith Vogt, Ltd.; Keith A. Vogt

(57) ABSTRACT

An antenna comprising: input and output coaxial horn antennas coupled with a self-assembled helical slow-wave structure cradled in a groove in a silicon-on-insulator wafer.

5 Claims, 4 Drawing Sheets

HELICAL SLOW-WAVE STRUCTURES WITH INTEGRATED COUPLERS OF THz RADIATION: DEVICES AND METHODS OF FABRICATION

RELATED APPLICATIONS

This application claims priority to U.S. Provisional Application No. 63/424,465, filed on Nov. 10, 2023, which is incorporated herein in its entirety.

STATEMENT REGARDING FEDERALLY SPONSORED RESEARCH & DEVELOPMENT

This invention was made with government support by the U.S. AFOSR grant Nos FA9550-19-1-0086 and FA9550-22-1-0301. The government has certain rights in the invention.

INCORPORATION BY REFERENCE OF MATERIAL SUBMITTED ON A COMPACT DISC

Not applicable.

BACKGROUND OF THE INVENTION

Self-assembled conductive helices (SACHs) have potential applications as slow-wave structures, metamaterials' unit cells, and transmitting/receiving antennas operating at THz frequencies. However, current SACHs face challenges such as reliable integration of couplers of THz radiation in and out of the helix via a scalable process. An integrated SACH with couplers of THz radiation is needed to characterize transmission of THz radiation through the structures and for the application of the helices in traveling-wave tubes and as antennas.

BRIEF SUMMARY OF THE INVENTION

In one aspect, the present invention concerns a device and method that realizes effective coupling of THz radiation with a self-assembled conductive helices (SACHs) with microscale diameter and pitch.

In another aspect, the present invention concerns a device and method wherein the antennas, such as coaxial horn antennas, are used as couplers and are integrated on the backside of the same wafer that the helical SACHs are fabricated on, thereby realizing a more compact design than laterally integrated couplers with SACHs.

In another aspect, the present invention concerns a device and method wherein the vertical integration of microscale couplers and SACHs on the same substrate is achieved via a scalable process that guarantees sub-micrometer tolerances or less.

In other embodiments, the present invention provides self-assembled helical slow-wave structures having unique advantages such as reliable integration of couplers of THz radiation in and out of the helix via a scalable process; a front surface available for processing (versatile design); (Relatively) large critical dimensions; no alignment and bonding required; input and output ports that can be isolated; and scalable structures in a wide range.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

The sidewalls of the through-hole are coated with Au. g) The thin Au film serves as a seed layer for electrodeposition of Au to fill the hole through to the top of the oxide. h) The contact pads and helix arm trenches are defined with photolithography, followed by Ge and then Au deposition. i) Lift-off removes the excess Ge/Au. j) A helical SACH is formed by selectively etching the Ge layer beneath the arms, allowing the stressed Au arms to curl into a helix, thereby connecting the ends of the SACH to the metal interior strips of the coaxial horn antennas.

Figure 8A:
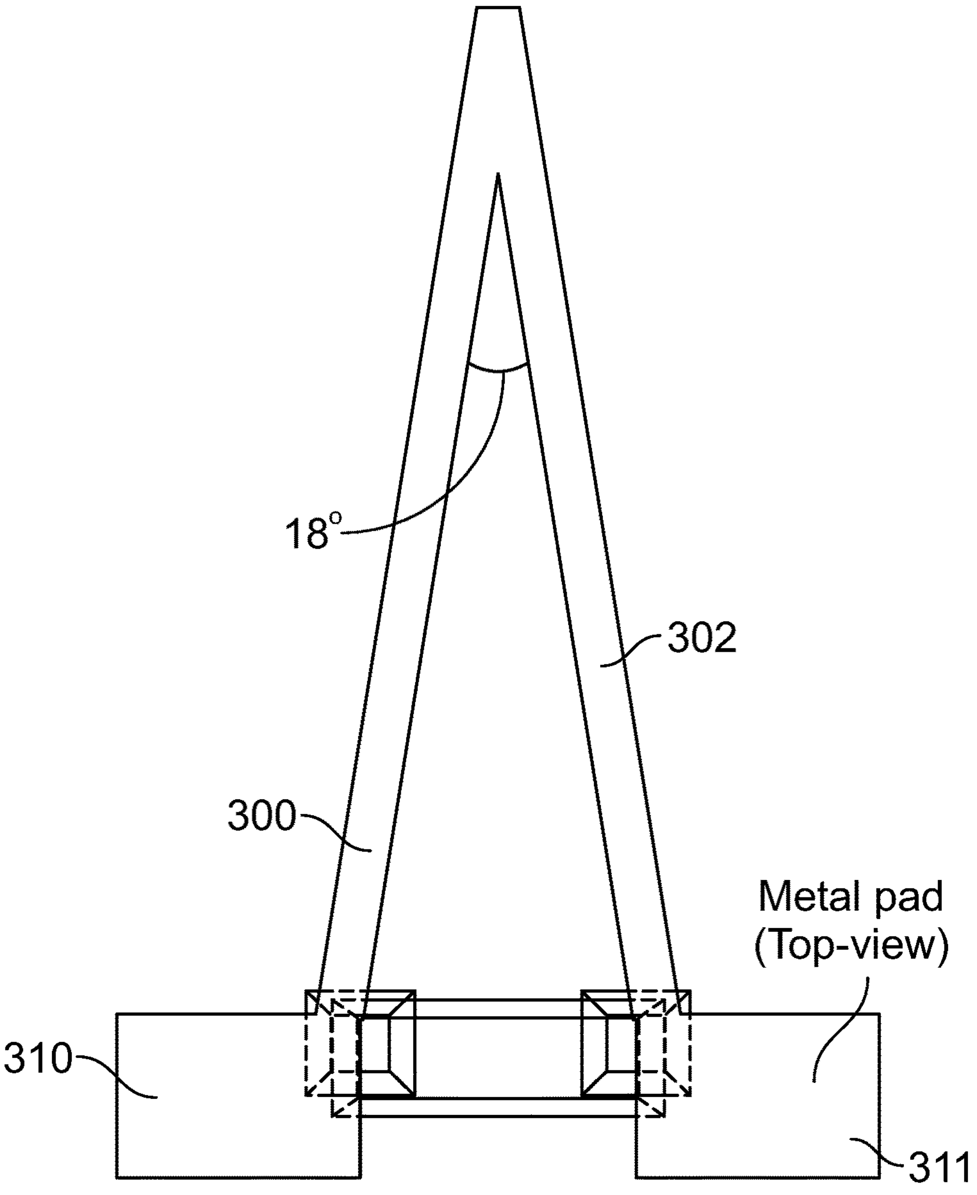

FIG. 8A is a schematic diagram showing the structure and layers of the helical SACH as well as the arms and contact pads structure coupled to an input and an output antenna.

Figure 8B:
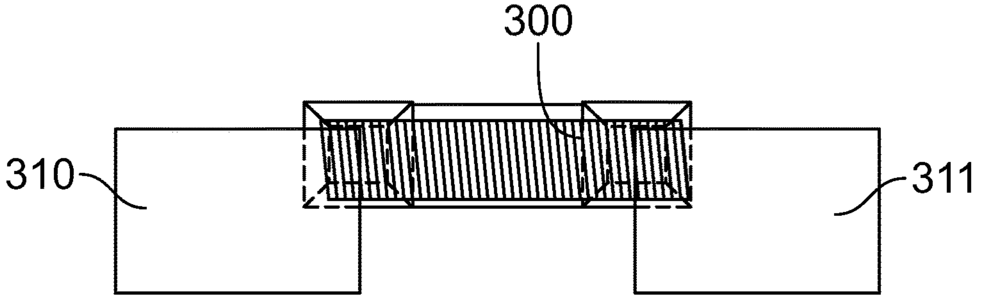

FIG. 8B is a schematic diagram showing the structure and layers of the helical SW after the Ge is selectively etched as well as how the Au arm strips relieve stress by curling into a helix.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure, or system. Further, the terms and phrases used herein are not intended to be limiting, but rather to provide an understandable description of the invention.

In one embodiment, as shown in FIGS. 1-5, the present invention provides a novel device that couples input and output coaxial horn antennas 100A and 100B with a self-assembled conductive helical (SACH) 110 cradled in groove 120, which may be V-shaped, in a silicon-on-insulator (SOI) wafer 130. The embodiments of the present invention enable the characterization of cold parameters and beam-wave interaction in SACHs on a wafer level, i.e., without having to dice and package individual devices. In addition, such vertically integrated antennas and helical SACHs may be an integral part of eventual commercial THz-frequency traveling-wave tubes (TWTs). The presence of metal strips 140A and 140B integrated within the horn antenna improves the coupling of an electromagnetic wave into and out of the helix.

FIGS. 1-5 show a coaxial horn antenna 100 integrated with a self-assembled conductive helical SACH 110 for an embodiment of the present invention. The structure was simulated in the frequency domain solver of the CST Microwave Studio (CST-MS) to obtain its S-parameters. The simulated structure includes a gold tape helix with a given length and two integrated horn antennas as input and output ports.

To couple the electromagnetic wave into and out of helix 110 precisely, in the present invention, the ends of helix 110 are connected to strip lines 140A and 140B that reach the larger aperture of the horn antennas. These apertures on the 140 μm Si substrate and strip lines create coaxial horn structures. The space 160 between the horns 100A and 100B and the inner conducting strips 140A and 140B may be filled with a polymer dielectric and excited by CST waveguide ports.

Figure 6:
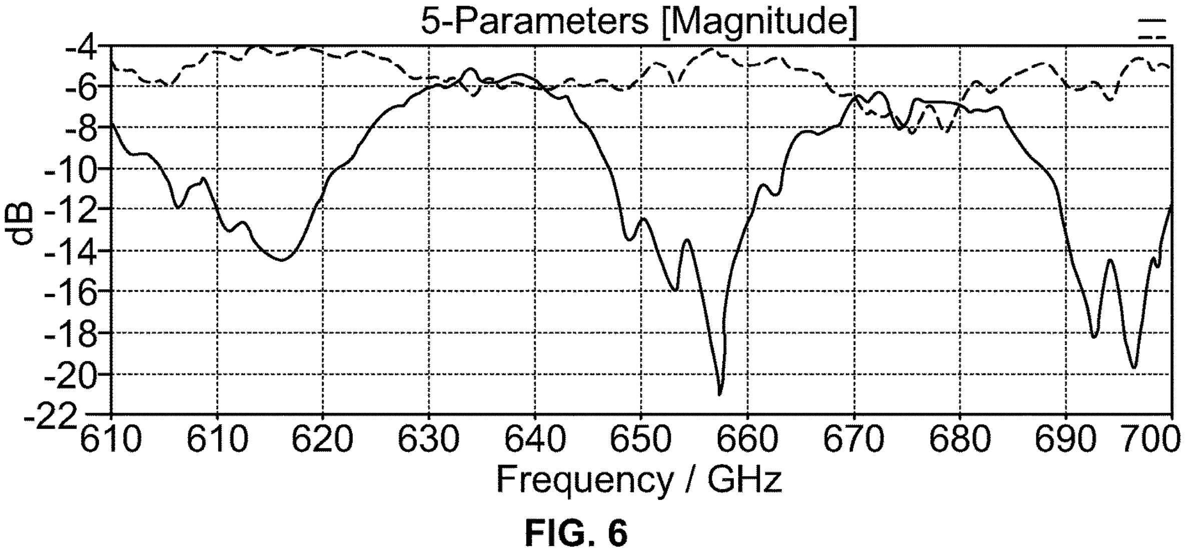
FIG. 6 shows the amplitude (in dB) of the simulated scattering parameters (S-parameters) for an embodiment of the present invention.

FIG. 6 represents the simulated return loss, $|S_{11}|$, and insertion loss, $|S_{21}|$, of the structure from 600 to 700 GHz. The simulated insertion loss is above −6 dB in most ranges of frequency, confirming that this novel type of excitation is a viable route for increasing the coupling radiation in and out of the helix. The parameters of the simulated structure for one embodiment of the invention are presented in Table I.

TABLE I

Parameters of the optimized device between 600 and 700 GHz.

| Helix Diameter, D | Helix Pitch, p | Tape Width, W | Tape Thickness, h | Length of Helix, L |
|---|---|---|---|---|
| 40 μm | 40 μm | 24 μm | 3.0 μm | 1.0 mm |
| Thickness of Si handle wafer | Thickness of $SiO_2$ | Thickness Si device layer | Size of large aperture of the horn antenna | Size of small aperture of the horn antenna |
| 140 μm | 1.0 μm | 50 μm | 250 × 250 $μm^2$ | 50 × 50 $μm^2$ |

Figures 7A, 7B, 7C, 7D, 7E, 7F, 7G, 7H, 7I, 7J:
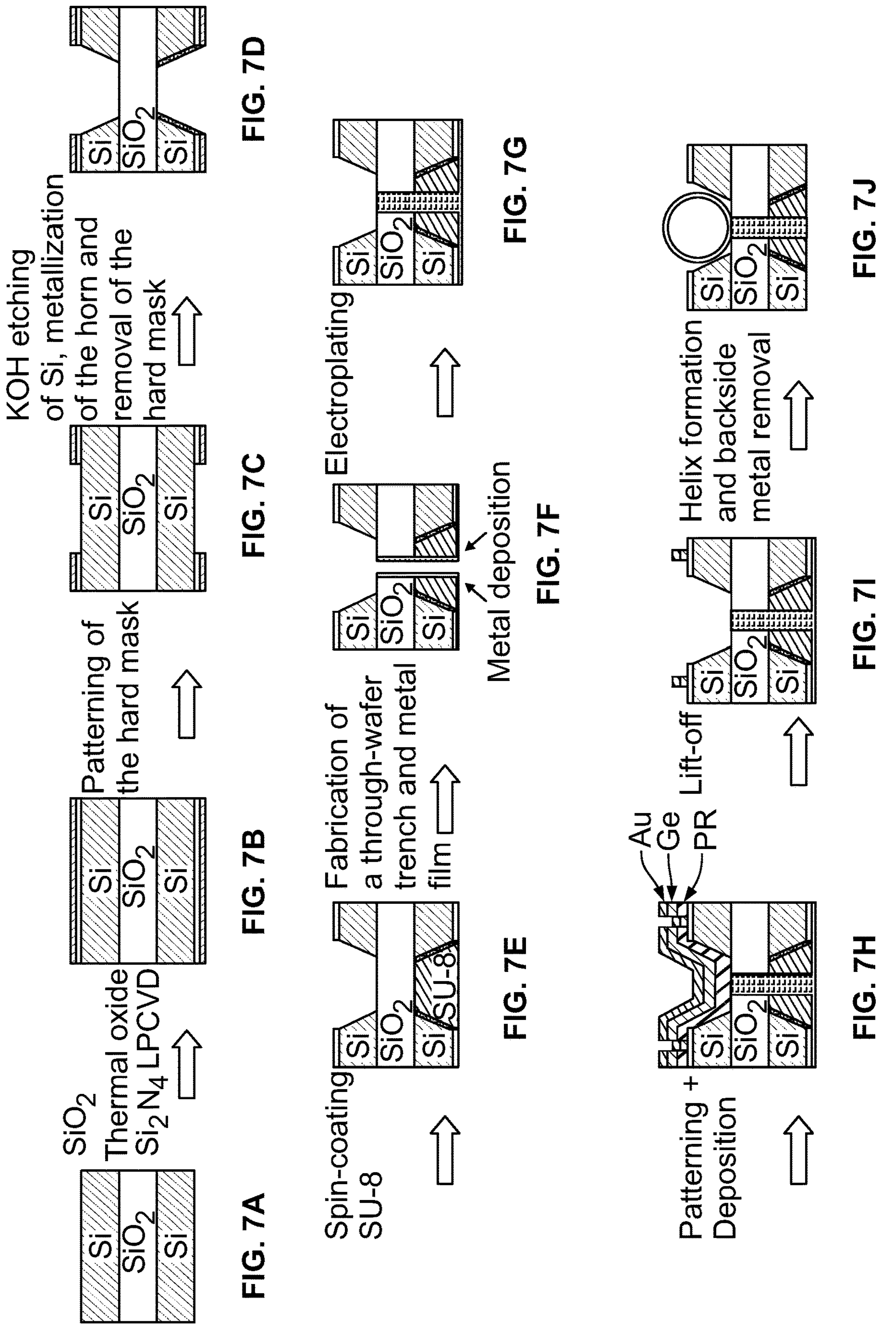
FIGS. 7A, 7B, 7C, 7E, 7E, 7F, 7G, 7H, 7I and 7J are cross-sectional schematic diagrams of the fabrication process. All dimensions were determined from simulations. a) SOI with layer thicknesses (top to bottom) 5 μm Si, 1 μm oxide, 140 μm Si handle b) Etch mask formation. c) mask patterning—the front side opening can range from 50-100 μm in width and of order 1 mm in length (not shown in the cross-section), and the backside openings are optimized at 250×250 $\mu m^2$ which will provide for 50×50 $\mu m^2$ openings at the oxide layer, due to the anisotropy of the KOH etching. d) After KOH etching, the trenches on the backside of the wafer are metalized with a 10 μm-thick Au film. e) SU8 is used to fill the back cavity, f) a 3 μm through-hole is formed to connect the top and bottom etched structures. In other embodiments, the through hole may be square, rectangular or have other geometries.

FIGS. 7A-7J show the fabrication of the structures of the present invention via a series of semiconductor processing steps on silicon-on-insulator (SOI) wafers. Commercially available SOI is thinned via grinding from the backside to the handle wafer thickness determined from simulations (FIG. 7A). The sample is then thermally oxidized. A silicon nitride film is deposited onto the thermal oxide. The thermal oxide and the silicon nitride form a hard mask (FIG. 7B) and are then patterned and etched to provide openings to the underlying Si on both sides (FIG. 7C). In other embodiments, multiple layers of silicon oxide and silicon nitride in various combinations may be used to reduce pin-holing.

The Si on both sides is anisotropically wet etched in potassium hydroxide (KOH) to form the trench for the helix and the start of the backside horn antenna (FIG. 7D. The thermal oxide/silicon nitride multilayer prevents Si etching in KOH. The silicon nitride is removed in phosphoric acid. The backside etched trench is metalized to a film thickness ranging from 1 to 10 μm with a combination of thin-film deposition and electroplating. The backside cavity is filled with a dielectric polymer (e.g., SU-8) via spinning the polymer, and photolithographic masking and etching to remove the remaining material surrounding the cavity (FIG. 7E). A through-hole is formed between the backside and frontside etched regions using photolithography and etching of the SU8. The SU-8 serves as a mask for Cl and F-based reactive ion etching of the oxide and Au layers. Metal is introduced into the trench via physical vapor deposition to generate a seed layer (FIG. 7F) for electroplating, forming the Au strip (FIG. 7G). The front side is lithographically patterned with photoresist (PR) to define trenches in the shape of the pads and connecting arms. (FIG. 7H). A sacrificial Ge layer is then deposited over the PR, followed by the deposition of a stressed Au layer. PR lift-off removes the excess Ge and Au, leaving behind the bilayer pads and arms (FIG. 7I). The helical SACH is fabricated on the front side of the wafer wherein Ge is selectively etched in either hot water or $H_2O_2$, causing the stressed Au arms to curl to form the helix, as shown in FIG. 7J (a schematic diagram with more detail of the helix/antenna/trench system is shown in FIG. 8), forming a connection between the SACH and the coaxial horn antennas at either end of the helix (one input, one output). The backside metal is removed to prevent reflection from the illuminating beam.

Figure 1:
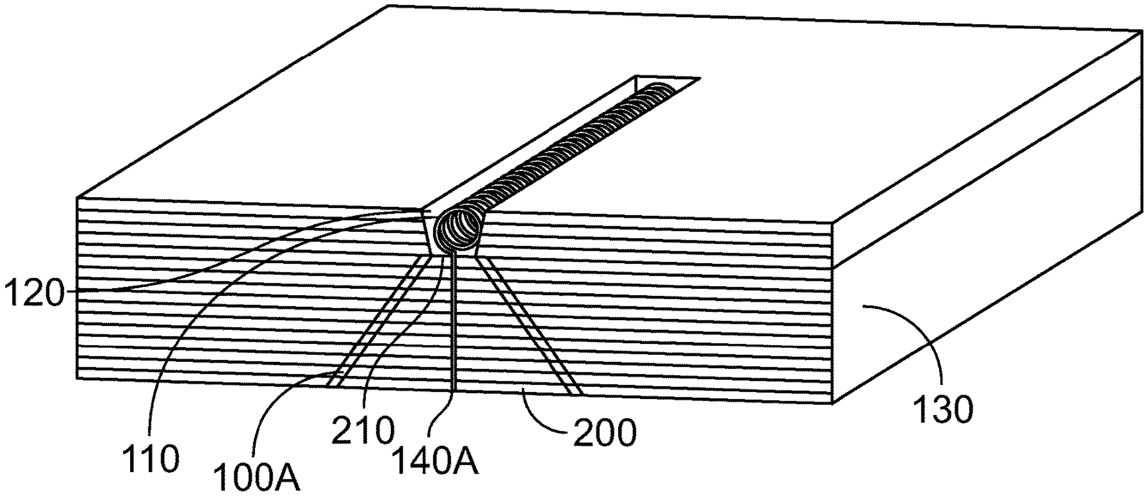
FIG. 1 is a side view of a coaxial horn antenna integrated with a self-assembled helix for an embodiment of the present invention.
Figure 2:
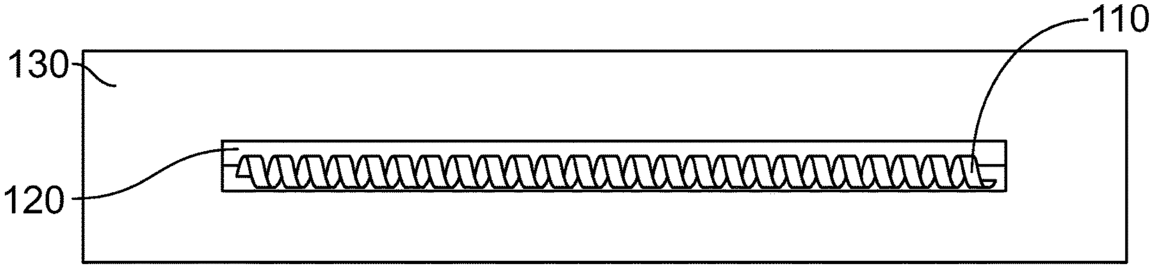
FIG. 2 is a top view of a coaxial horn antenna integrated with a self-assembled helix for an embodiment of the present invention.
Figure 3:
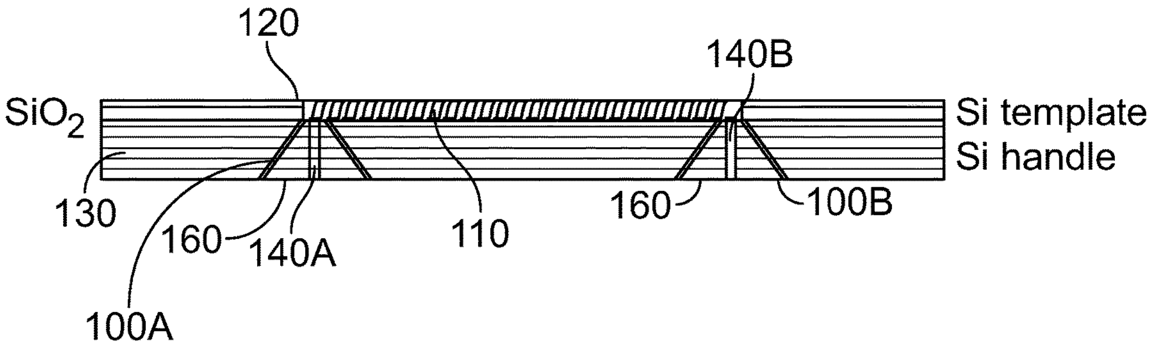
FIG. 3 is a cross-sectional view of a coaxial horn antenna integrated with a self-assembled helix for an embodiment of the present invention.
Figure 4:
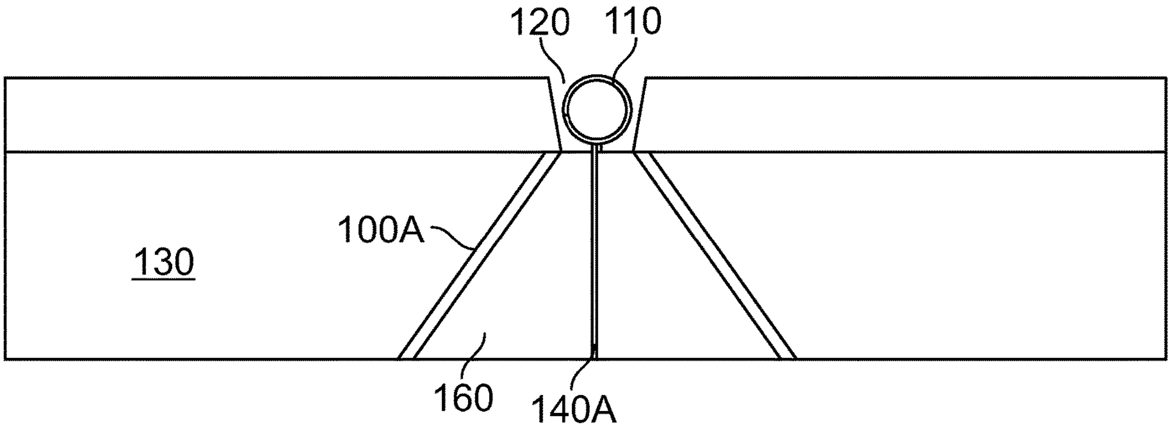
FIG. 4 is another cross-sectional view of a coaxial horn antenna integrated with a self-assembled helix for an embodiment of the present invention.
Figure 5:
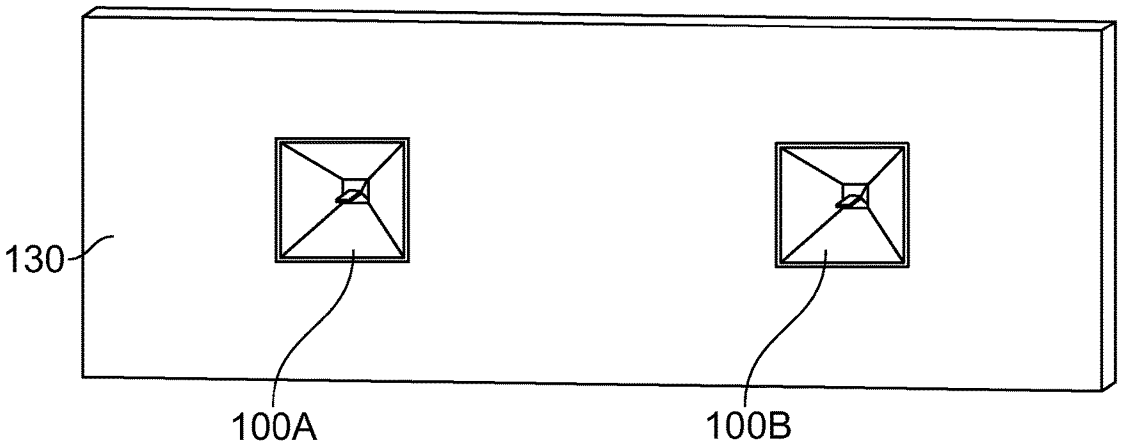
FIG. 5 is a bottom view of a coaxial horn antenna integrated with a self-assembled helix for an embodiment of the present invention.

In one embodiment of the invention, as shown in FIG. 1, the large aperture 200 and the small aperture 210 of the coaxial horn antenna 100A are optimized at 250×250 $μm^2$ and 50×50 $μm^2$, respectively. The inner conductors of the coaxial horns are optimized at cross-sectional areas of 3×24 $μm^2$. This embodiment of the invention is optimized for a frequency ranging from 600 to 700 GHz. However, the device and the fabrication method are scalable for operation in the entire THz range of the electromagnetic spectrum (i.e., from 300 GHz to 3 THz).

FIGS. 8A and 8B are schematic diagrams showing the structure and layers of the helical SW structure coupled to an input and an output antenna. FIG. 8A shows the arms 300 and 302 and contact pads 310 in relation to the top-side trench and the input and output antennas. FIG. 8B shows that after the Ge is selectively etched, the Au arm strips 300 and 302 relieve stress by curling into a helix.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should, therefore, not be limited by the above-described embodiments, methods, and examples, but by all embodiments and methods within the scope and spirit of the disclosure.

What is claimed is:

1. A device comprising: input and output coaxial horn antennas coupled with a self-assembled helical slow-wave structure cradled in a trench in a silicon-on-insulator wafer.

2. The device of claim 1 wherein said trench is V-shaped.

3. The device of claim 2 further including metal strips integrated within the horn antennas to improve the coupling of the electromagnetic wave into and out of the helix.

4. The device of claim 3 wherein said coaxial horn antennas, are used as couplers and are integrated on the backside of said SOI wafer and said self-assembled helical slow-wave structure are located on the top side of said SOI wafer.

5. The device of claim 1 wherein said trench is in the shape of a truncated pyramid.

* * * * *